Oct. 24, 1939.   R. A. SANDBERG   2,177,191
METHOD OF APPLYING A PIVOT PIN TO THIN STOCK
Filed July 29, 1938
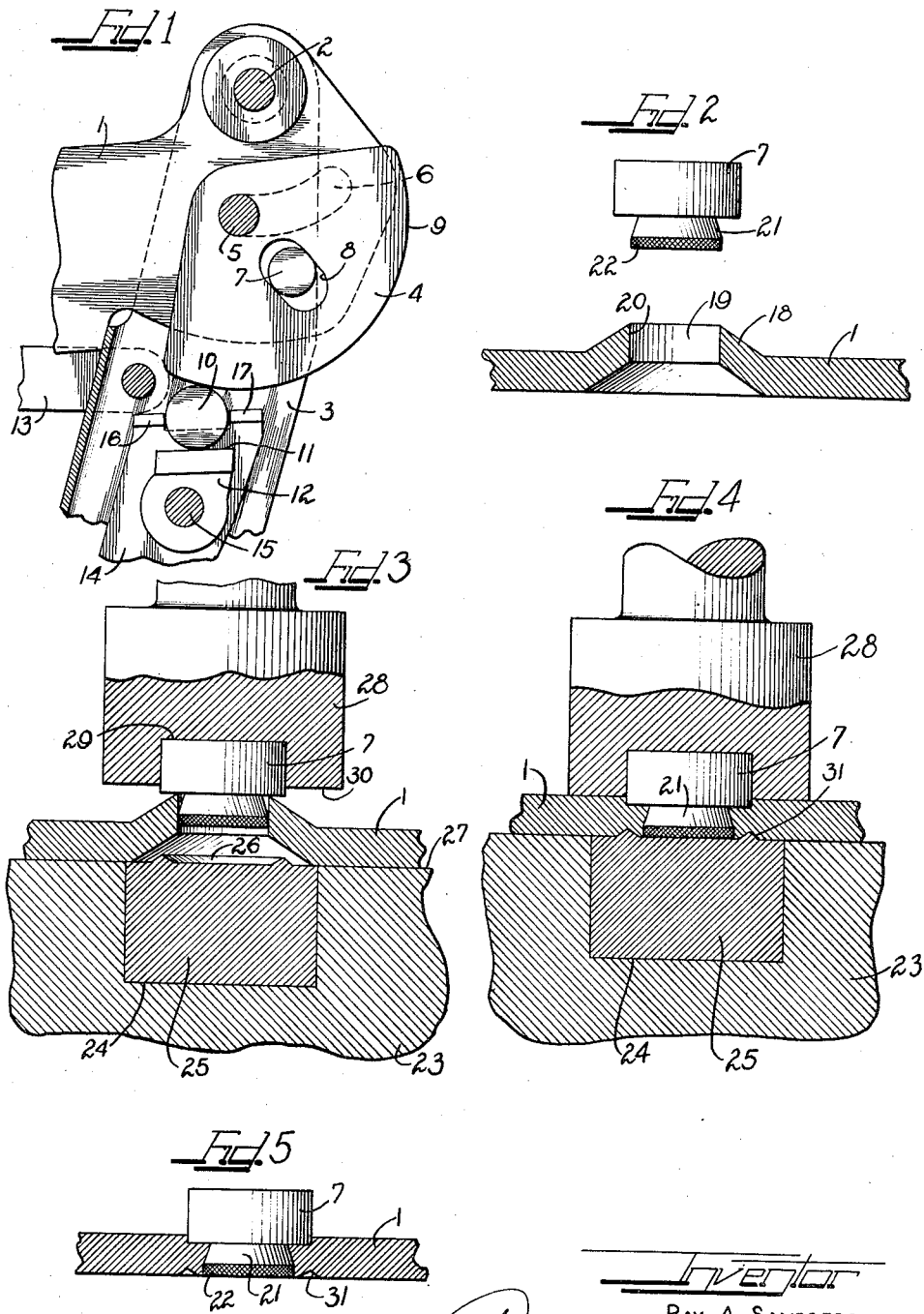
Inventor
RAY A. SANDBERG Patented Oct. 24, 1939

2,177,191

UNITED STATES PATENT OFFICE

2,177,191

METHOD OF APPLYING A PIVOT PIN TO THIN STOCK

Ray A. Sandberg, Waukegan, Ill., assignor to Houdaille-Hershey Corporation, Detroit, Mich., a corporation of Michigan Application July 29, 1938, Serial No. 221,978

1 Claim. (Cl. 29—148)

The present invention relates to a method of applying a pivot pin to thin stock, and will be explained in connection with the application of a stud to a thin metal mounting plate or bracket serving as a pivotal support for a dash or cowl type emergency brake lever for automotive vehicles.

Dash or cowl type emergency brake levers, for automotive vehicles, employing floating sectors or swinging ratchet plates are constructed so that the sector or ratchet plate is oscillated about its pivotal connection to the brake lever by means of a stud carried by the mounting plate or bracket and working within a slot in the floating sector or swinging ratchet plate. As the lever is moved in service, shearing strain is imposed on the stud.

Recently, some automobile manufacturers have specified that the mounting plate or bracket, for dash or cowl type brake levers, shall be of a thin metallic stock, as thin as $\frac{5}{32}$ of an inch.

To apply a stud to a mounting bracket of only $\frac{5}{32}$ of an inch in thickness, so that the stud will remain in place against dislodgment due to shearing strain, is the primary object of the present invention.

Automotive vehicle brake levers are designed to last the lifetime of the cars free of repair or replacement. Should a brake lever be so constructed as to require repair or replacement before the end of the car life, it becomes undesirable and a nuisance to the car owner or operator.

Therefore another object of the present invention is to provide in a brake lever construction of the floating sector type, a stud embedded in thin material in such fashion as to remain in place for the lifetime of the usefulness of the car.

A further object of the present invention is to provide a novel method of applying a stud to thin metallic stock, in which the stud is provided with a pin or shank portion embedded in the material of the plate and in which the head portion of the stud is embedded in the material of the plate, to a slight extent, so that shearing strains imposed on the head of the stud will be transmitted directly by the head to the material of the supporting plate and, in the main, removed from the pin or shank.

A still further object of the present invention has to do with a novel method of embedding a stud which is subjected to shearing strains, in a supporting plate in such manner that repeated shearing strains applied to the stud will not dislodge it, or move it one iota, from its embedded position in the plate.

The above, other and further objects of the present invention will be apparent from the following description and accompanying drawing.

The accompanying drawing illustrates various steps followed in the method of the present invention, and also illustrates the completed device including a stud embedded in a piece of thin metal in a manner to prevent displacement of the stud incidental to shearing strains imposed on it and the views thereof are as follows:

Figure 1 is a fragmental view, partially in elevation and partially in section, of the fulcrum end of a brake lever of the dash type equipped with a floating sector and is illustrated as having friction means for clutching the lever shaft in adjusted position.

Figure 2 is a view, partially in section and partially in elevation, showing in section a fragmental portion of a thin metal mounting plate or bracket after a portion has been dished and pierced, to receive the shank of the stud shown above it.

Figure 3 is a sectional view of the dies, employed in the process of the present invention, for embedding the stud in the mounting plate, and showing the parts as assembled and immediately prior to the application of pressure to the punch.

Figure 4 is a view similar to Figure 3 showing the completion of the die or pressure operation with the stud embedded in the thin metal plate, the stud being shown in elevation and the plate in section.

Figure 5 is a fragmental view, partially in section and partially in elevation, of a completed structure wherein a stud has been embedded in a thin metal plate in accordance with the method of the present invention.

The drawing will now be explained.

Figure 1 illustrates a fragmental portion of a mounting plate I having pivoted to it at 2 straight parallel legs of a lever member 3, which latter is shown as a stamping of general U-shaped configuration in cross section. A floating sector 4 is pivoted by means of a pin 5 to the legs of the lever member 3, the mounting plate or bracket I being arcuately slotted at 6 in order that the pin 5 may pass through the mounting plate. A stud 7 is embedded in the mounting plate I and works within an elongated slot 8 formed in the floating sector 4. As the lever member 3 is swung back and forth on its pivot 2, the floating sector will be rocked about the stud 7 as a center thus moving its clutching surface 9 to and fro with respect to a cooperating clutching member 10, shown in the present instance as a roller carried by the lever shaft 3 and working between the clutching surface 9 of the sector and a flat surface 11 of an abutment member 12 carried by the lever shaft.

As the lever shaft 3 is swung in counterclockwise direction, floating sector 4 will be swung in clockwise direction. When the lever shaft 3 tends to retrograde movement due to pull of the brake mechanism, which is connected to the shaft by means of linkage 13, the floating sector pull will tend to swing in counterclockwise direction, which urges the roller 10 to the right, and thus frictionally clamping the roller between the clutching surface 9 and the surface 11 to hold the lever shaft in adjusted position.

A release member 14 is pivoted at 15 to the lever shaft and is provided with lugs 16 and 17 arranged to engage opposite portions of the roller 10, for displacing it from friction holding engagement between the surfaces 9 and 11.

In Figures 2, 3, 4 and 5 a portion of the mounting plate or bracket 1 is shown in section and is drawn full size for a $\frac{5}{32}$ inch thickness plate.

The first step in the method of the present invention is to dish that portion of the plate 1 which receives the stud 7. The dishing operation is accomplished by suitable tools forming a dished portion 18 as illustrated.

The next step is to punch or pierce the bottom of the dished portion forming an aperture or hole 19 with the walls 20 thereof perpendicular to the plane of the faces of the plate 1.

The stud 7 has a head and a reversely tapered pin extension or shank 21, the latter terminating in a cylindrical end portion 22 which preferably is knurled. The diameter of the knurled portion 22 of the shank or pin is less than the diameter of the head of the stud and is substantially that of the pierced hole 19 in the dished portion of the plate.

Referring to Figures 3 and 4, 23 is a bed plate of a die press which is recessed at 24 to receive the lower die block 25. This block on its active surface is provided with an upstanding circular V-shaped rib 26 projecting above the top surface 27 of the block 23 and the lower surface of the plate 1 when the same is in position on the block.

The punch block 28 is provided with a suitably shaped recess 29 to receive a portion of the head of the stud 7. The head of the stud extends into the recess 29 a distance less than the axial length of the head, so that a portion of the head projects below the bottom surface 30 of the punch 28.

Pressure is applied to the punch 28 in any suitable manner, forcing the punch downwardly to the final position as illustrated in Figure 4.

The inclination of the reversely tapered shank or pin portion 21 is such that as the punch head 28 drives the stud downwardly to flatten the dished portion 18 of the plate, the dished portion will be flattened against the faces of the block 25 and the block 27 so as to be coincident with the opposite faces of the plate 1. This motion causes the marginal portion of the hole 19 to wrap around the tapered portion 21 of the shank in tight holding engagement. The plate 1 is of soft metal so that when the stud is finally driven home to bottom the lower end of the shank on the upper surface of the block 25, the head of the stud will be driven into the plate a slight distance, as clearly shown in Figures 4 and 5. The upstanding ring 26 on the block 25 embosses a ring-like recess 31 in the lower face of the plate and surrounding the shank or pin 21 of the stud to increase the holding effect between the stud and the plate. Driving the head of the stud into the plate further compresses the metal between the lower surface of the stud head and the lower face of the plate while in the press so that the metal of the plate is forced into tight holding engagement with the tapered portion as well as with the cylindrical portion 22 of the shank of the stud, thus firmly holding it in position.

A stud or pin applied to a thin sheet of metal, in accordance with the present invention, will withstand a load greatly in excess of two thousand pounds applied axially against the exposed end of the shank before becoming loosened, even to a slight extent.

It has been found that in brake levers of the floating sector type, an endwise force applied to the shank of the stud, of two thousand pounds or more, and which the stud successfully resists, is adequate proof of the strength of the application of the stud to the plate, as in actual use, no such strain or stress is applied to the stud.

It will be apparent that all strain applied to the stud, in the operation of the floating sector 4, of the illustrated form of brake, is a shearing stress or strain.

Because of the manner in which the metal of the plate is tightly forced against the shank of the stud, and because of the fact that a portion of the head of the stud is embedded in the plate, shearing stress applied to the stud will not loosen it.

The construction mentioned provides a structure which will last the lifetime of any automobile to which the brake may be applied.

It is to be understood, of course, that the present invention is not limited to brake lever construction, but is directed to a method which may be followed wherever it is necessary to insert a stud in a relatively thin piece of metal in which the pin must be held against loosening, regardless of the amount of shearing stress applied to it.

It will be noted that the stud is inserted in the hole 19 of the dished portion 18 from the convex surface of the same, and that the pressure is applied in a direction to flatten the dished portion so as to cause intimate holding engagement between the metal surrounding the hole in the plate and the shank portion of the stud.

The invention has been described herein more or less precisely as to details, yet it is to be understood that the invention is not to be limited thereby, as changes may be made in the arrangement and proportion of parts, and equivalents may be subsituted, without departing from the spirit and scope of the invention.

The invention is claimed as follows:

A method of inserting a metallic stud in a thin metallic material which consists in forming a stud with a reversely tapered pin extension of less length than the thickness of said material, serrating the extremity of said extension adjacent its end, dishing a portion of said material, piercing the dished portion to form a hole, inserting the stud extension in said hole whereby the extension projects only part way into said hole and the serrated end of said extension is between the ends of the hole, and applying pressure to the stud and the opposite face of the material to flatten the dished portion of the material to thereby cause it to squeeze said pin with holding action and to drive the stud into the material an amount which is substantially that of the difference between the length of the pin extension and the thickness of the material to force the end of the extension into substantially flush position with respect to the opposite face of the material, and simultaneously pressing a ring groove in the opposite face of the material about the pin to force material tightly against the serrated end of the pin.

RAY A. SANDBERG.